(12) United States Patent
Gill (10) Patent No.: US 7,643,255 B2
(45) Date of Patent: Jan. 5, 2010

(54) ANTI-PARALLEL MAGNETIZATION LAYERS IN THE FREE LAYERS AND MAGNETIZATION LAYERS OF A DIFFERENTIAL SENSOR READ HEAD

(75) Inventor: Hardayal (Harry) Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 439 days.

(21) Appl. No.: 11/378,824

(22) Filed: Mar. 17, 2006

(65) Prior Publication Data

US 2007/0217089 A1  Sep. 20, 2007

(51) Int. Cl.
  *G11B 5/39* (2006.01)
(52) U.S. Cl. .................................. 360/324.12
(58) Field of Classification Search ............. 360/324.12
  See application file for complete search history.

(56) References Cited

U.S. PATENT DOCUMENTS

| | | | |
|---|---|---|---|
| 4,589,041 A | 5/1986 | Voegeli | 360/113 |
| 5,479,308 A | 12/1995 | Voegeli | 360/113 |
| 5,627,703 A | 5/1997 | Smith | 360/113 |
| 6,621,664 B1 | 9/2003 | Trindade et al. | 360/318 |
| 6,643,103 B1 | 11/2003 | Trindade | 360/314 |
| 6,661,620 B2 | 12/2003 | Seigler et al. | 360/314 |
| 7,298,595 B2 * | 11/2007 | Gill | 360/314 |
| 2003/0011939 A1 | 1/2003 | Gill | 360/314 |
| 2003/0227721 A1 | 12/2003 | Gill | 360/314 |
| 2005/0280957 A1 * | 12/2005 | Gill | 360/324.12 |

* cited by examiner

*Primary Examiner*—A. J. Heinz (57) ABSTRACT

One embodiment of the present invention is directed to a read head for a data storage device including a differential sensor for reading data from a data storage medium. The differential sensor includes a first and a second free layer. The magnetization of the free layers is anti-parallel. The read head also includes a first stabilization material disposed adjacent to the differential sensor. The first stabilization material includes a first hard magnet and a second hard magnet. The magnetization of the hard magnets is anti-parallel to each other. The read head also includes a second stabilization material disposed adjacent to the differential sensor. The second stabilization material includes a first hard magnet and a second hard magnet, wherein the magnetization of the hard magnets is anti-parallel to each other. The anti-parallel coupling of the first stabilization material and the second stabilization material enhances the anti-parallel magnetization of the free layers.

22 Claims, 6 Drawing Sheets

ANTI-PARALLEL MAGNETIZATION LAYERS IN THE FREE LAYERS AND MAGNETIZATION LAYERS OF A DIFFERENTIAL SENSOR READ HEAD

BACKGROUND OF THE INVENTION

Hard disk storage devices are used in many computer system operations. In fact, most computing systems are not operational without some type of hard disk drive or similar storage device to store the most basic computing information such as the boot operation, the operating system, applications, and the like.

The basic hard disk drive model includes a storage disk or hard disk that spins at a designed rotational speed. An actuator arm is utilized to reach out over the surface of the disk. The arm carries a head assembly that has a magnetic read/write transducer or head for reading/writing information to or from a location on the disk. The transducer is attached to a slider, such as an air-bearing slider, which is supported adjacent to the data surface of the disk by a cushion of air generated by the rotating disk. The transducer can also be attached to a contact-recording type slider. In either case, the slider is connected to the actuator arm by means of a suspension. The complete head assembly, e.g., the suspension and head, is called a head gimbal assembly (HGA).

In operation, the hard disk is rotated at a set speed via a spindle motor assembly having a central drive hub. Additionally, there are tracks evenly spaced at known intervals across the disk. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk.

Over the years, the disk and the head have undergone great reductions in their size. For example, the original hard disk drive had a disk diameter of 24 inches. Modern hard disk drives are much smaller and include disk diameters of less than 2.5 inches (micro drives are significantly smaller than that).

This continual reduction in size has placed steadily increasing demands on the technology used in the HGA, particularly in terms of power consumption, shock performance, and disk real estate utilization. One recent advance in technology has been the development of the Femto slider, which is roughly one-third of the size and mass of the older Pico slider, which it replaces; over the past 23 years, slider size has been reduced by a factor of five, and mass by a factor of nearly 100.

Some of the recent improvements to the head specifically have involved improving the accuracy of the sensor within the read head. One recent development in the area of the read head and sensor has been the proliferation of current perpendicular to the plane of the layers type sensors (CPP sensors). Previous sensors commonly used current in the plane of the layers instead.

In addition to the movement towards CPP sensors, it is also becoming more common to see differential sensors. Differential sensors involve two sensors, each separated by a conductive spacer (commonly made of copper). Each sensor has magnetically fixed layers and a magnetically "free" layer. The nature of the surrounding layers is such that the two free layers tend to magnetize parallel to each other. When a differential sensor reads a field from a bit, the bit is centered such that one free layer is detecting the bit's positive field and the other is detecting the negative field. The fields read by the two sensors are then summed. The advantage to differential sensors is that when a uniform field comes from the outside, any signal which is generated in both sensors is cancelled out.

New CPP sensors are not without their problems, however. In perpendicular data detection/recording, the disk typically has two layers: a recording layer and a soft under-layer. The under-layer is made of a soft material and has high permeability. Consequently, it will amplify any stray field from the outside environment. Sensors used in conjunction with shields, while proven to be insensitive to stray fields in the transverse direction, can become very sensitive to these stray fields in the longitudinal direction.

BRIEF SUMMARY OF INVENTION

Accordingly, one embodiment of the present invention is directed to a read head for a data storage device including a differential sensor for reading data from a data storage medium. The differential sensor includes a first free layer and a second free layer, wherein the magnetization of the free layers is anti-parallel. The read head also includes a first stabilization material disposed adjacent to the differential sensor. The first stabilization material includes a first hard magnet and a second hard magnet. The magnetization of the second hard magnet is anti-parallel to the magnetization of the first hard magnet. The read head also includes a second stabilization material disposed adjacent to the differential sensor. The second stabilization material includes a first hard magnet and a second hard magnet. The magnetization of the second hard magnet is anti-parallel to the magnetization of the first hard magnet. The anti-parallel coupling of the first stabilization material and the second stabilization material enhances the anti-parallel magnetization of the free layers.

Another embodiment of the present invention is directed to a data recording device including a disk with a data surface, a rotator for rotating the disk, and a read/write head for reading and writing data with respect to the data surface. The read/write head includes a differential sensor for reading data from a data storage medium. The differential sensor includes a first free layer and a second free layer, wherein the magnetization of the free layers is anti-parallel. The read head also includes a first stabilization material disposed adjacent to the differential sensor. The first stabilization material includes a first hard magnet and a second hard magnet. The magnetization of the second hard magnet is anti-parallel to the magnetization of the first hard magnet. The read head also includes a second stabilization material disposed adjacent to the differential sensor. The second stabilization material includes a first hard magnet and a second hard magnet. The magnetization of the second hard magnet is anti-parallel to the magnetization of the first hard magnet. The anti-parallel coupling of the first stabilization material and the second stabilization material enhances the anti-parallel magnetization of the free layers.

DETAILED DESCRIPTION OF THE INVENTION

A read head and a data recording device configured to use a read head are disclosed. Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
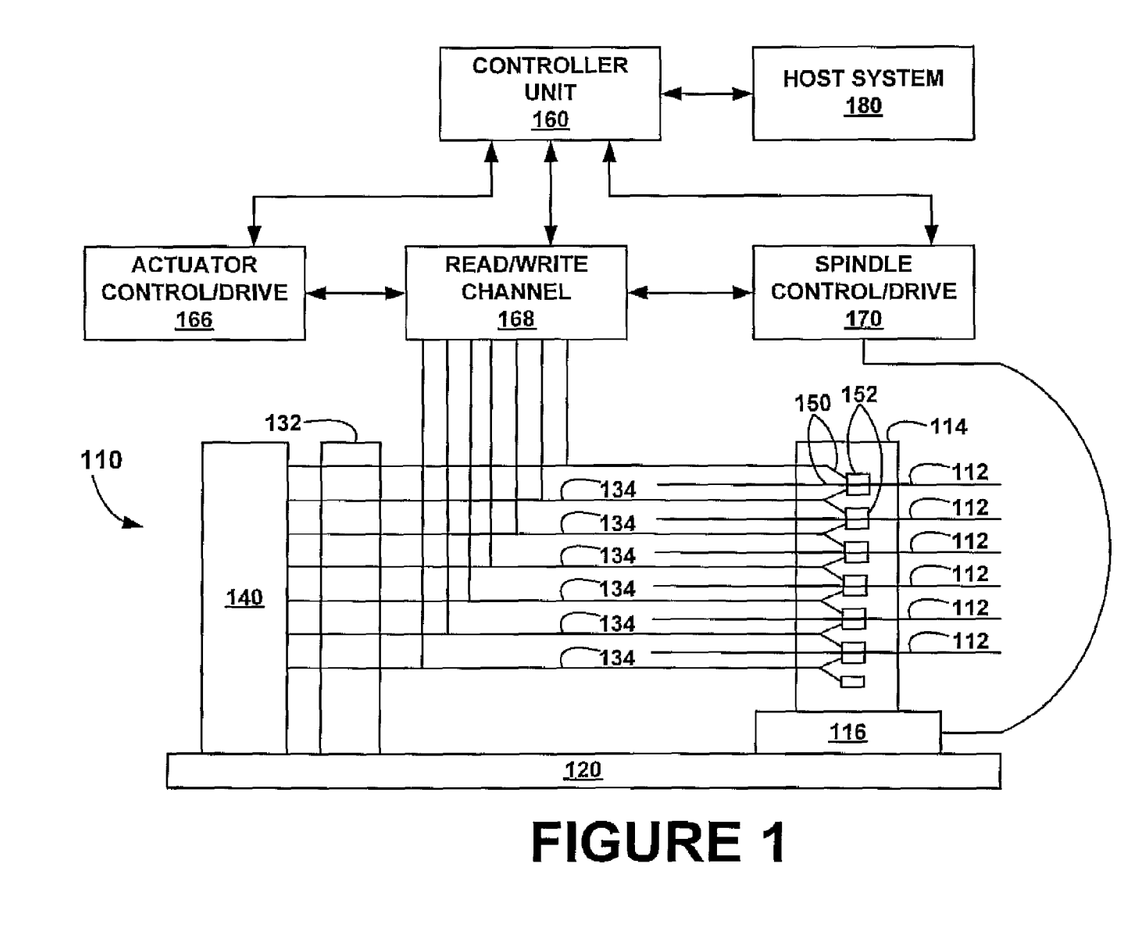
FIG. 1 is a side view of a hard disk drive and a controller unit in block form, in accordance with one embodiment of the present invention.
Figure 2:
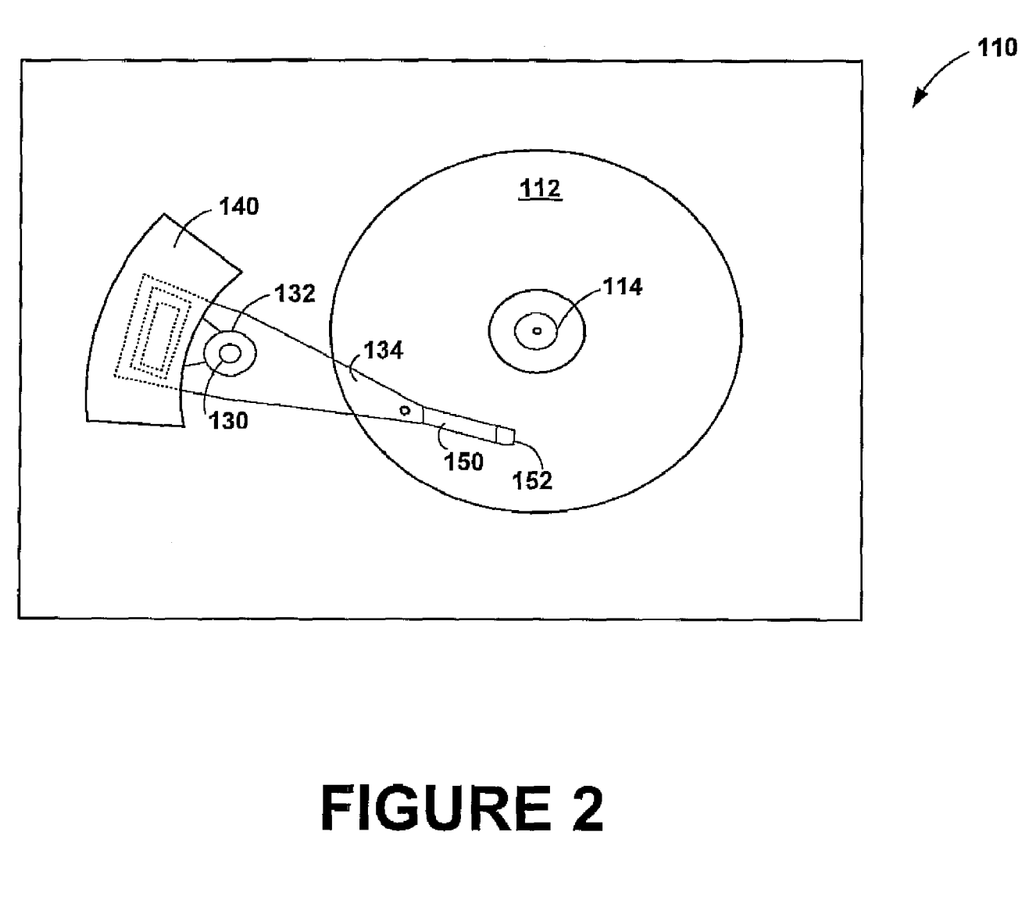
FIG. 2 is a side view of a hard disk drive and a controller unit in block form, in accordance with one embodiment of the present invention.

With reference now to FIGS. 1 and 2, a side and top view of a hard disk drive 110 is shown. Drive 110 has a disk pack having at least one media or magnetic disk 112, mounted to a spindle 114. A spindle motor 116 rotates the spindle 114 and the disk or disks 112. The spindle motor 114 and an actuator shaft 130 are attached to the chassis 120. A hub assembly 132 rotates about the actuator shaft 130 and supports a plurality of actuator arms 134, referred to as a "comb." A rotary voice coil motor 140 is attached to the chassis 120 and to a rear portion of the actuator arms 134.

A plurality of suspension assemblies 150 are attached to the actuator arms 134. A plurality of transducer heads or sliders 152 are attached respectively to the suspension assemblies 150. The sliders 152 are located proximate to the disks 112 for reading and writing. The rotary voice coil motor 140 rotates actuator arms 134 about the actuator shaft 130 in order to move the suspension assemblies 150 to the desired radial position on disks 112. The shaft 130, hub 132, arms 134, and motor 140 may be referred to collectively as a rotary actuator assembly.

A controller unit 160 provides overall control to system 110. Controller unit 160 typically includes (not shown) a central processing unit (CPU), a memory unit and other digital circuitry, although it should be apparent that one skilled in the computer arts could also enable these aspects as hardware logic. Controller 160 is connected to an actuator control/drive unit 166 that in turn is connected to the rotary voice coil motor 140. This configuration allows controller 160 to control rotation of the disks 112. A host system 180, typically a computer system, is connected to the controller system 160. The host system 180 may send digital data to the controller 160 to be stored on disks 112, or it may request that digital data at a specified location be read from the disks 112 and sent to the system 180. The basic operation of DASD units is well known in the art and is described in more detail in The Magnetic Recording Handbook, C. Dennis Mee and Eric D. Daniel, McGraw-Hill Book Company, 1990, which is hereby incorporated by reference as background material.

With reference now specifically to the read head, one solution to solving the problems associated with longitudinal stray fields as described above is to drive the magnetization of the free layers of a differential sensor to be anti-parallel. A deeper explanation of differential sensors is required to understand why anti-parallel magnetization will desensitize the differential sensor to longitudinal stray fields.

Figure 3:
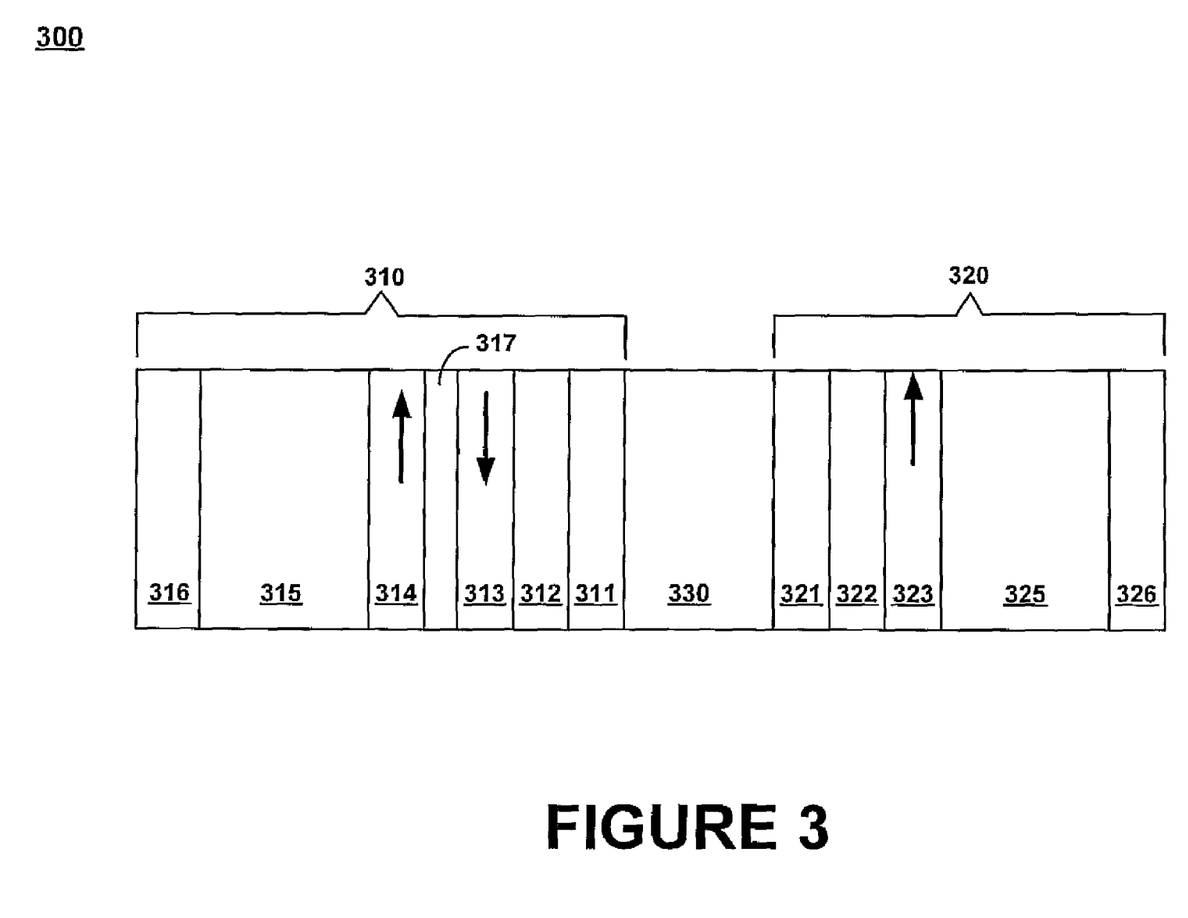
FIG. 3 shows an assembly of a differential sensor, in accordance with an embodiment of the present invention.

FIG. 3 shows a common assembly of a differential sensor. Differential sensor 300 has two independent sensors 310 and 320 separated by spacer 330. Sensors 310 and 320 each have a free layer 311 and 321 and pinned layers 313, 314, and 323, separated by spacers 312 and 322. Pinned layers 313 and 314 are separated by an additional spacer layer 317, which in one embodiment comprises ruthenium. Free layers 311 and 321 commonly comprise a cobalt iron alloy, a nickel iron alloy, or a combination of the two. Each sensor also includes an anti-ferromagnet 315 and 325 and a protection layer 316 and 326. The arrows in pinned layers 313, 314, and 323 indicate each layer's direction of magnetization. The magnetization of free layers 311 and 321 is either both going into the page or both coming out of the page. For the purposes of FIG. 3, the transverse direction should be understood as the vertical direction of the figure and the longitudinal direction should be understood as the direction going into the page.

Figure 4:
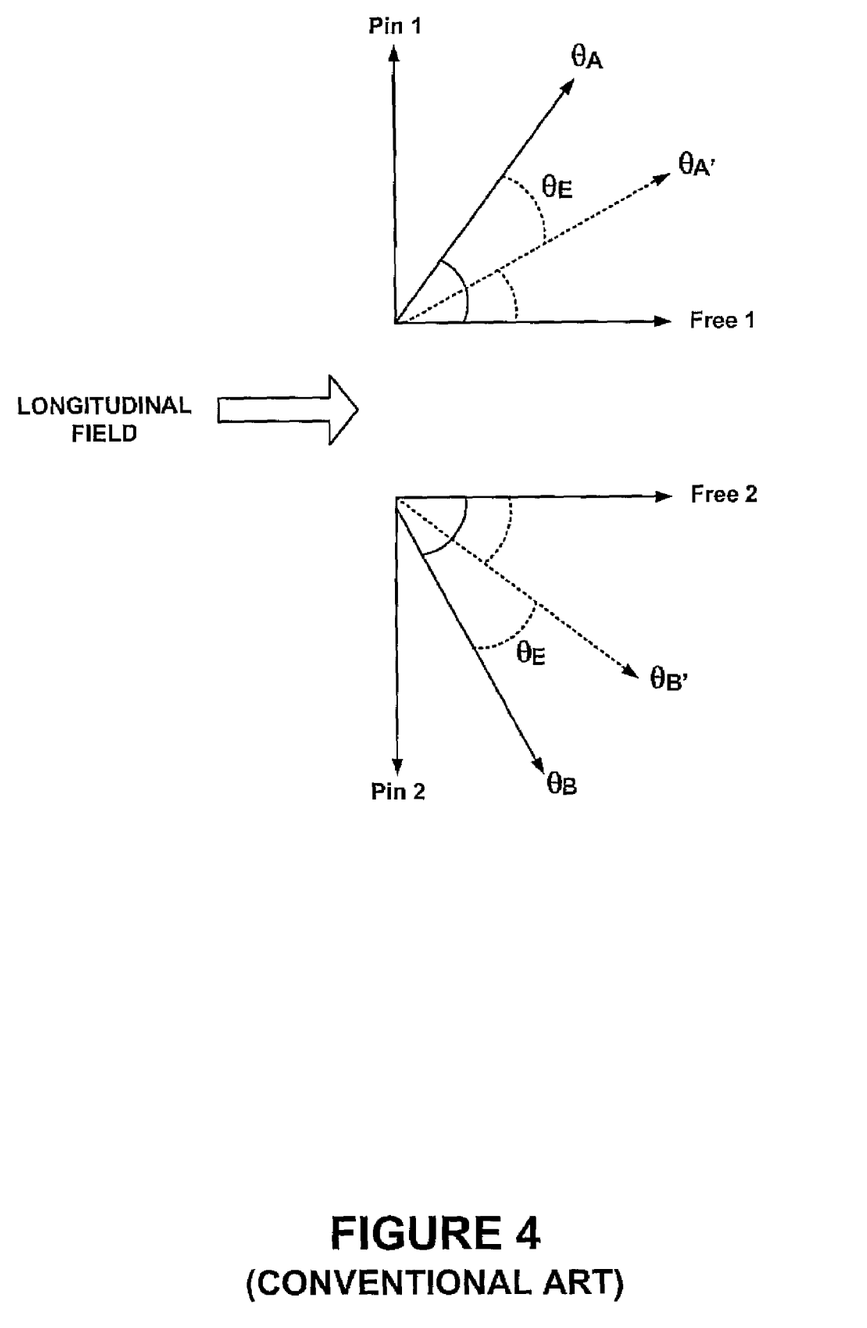
FIG. 4 graphically illustrates an example of the effect of longitudinal stray fields on prior art differential sensors.

FIG. 4 graphically illustrates an example of the effect of longitudinal stray fields on prior art differential sensors. During data detection, pinned layer 313 together with free layer 311 generate a magnetic signal corresponding to the positive field of the bit being read and pinned layer 323 together with free layer 321 generate a magnetic signal corresponding to the negative field of the bit. Sensors 310 and 320 have some resistance, and the signal read at each sensor is proportional to the angle between its respective free layer and pinned layer. In the absence of any stray field, the angle between free layer 311 (Free1) and pinned layer 313 (Pin1) would be $\theta_A$ and the angle between free layer 321 (Free2) and pinned layer 323 (Pin2) would be $\theta_B$. However, introducing a longitudinal stray field to the system as indicated causes the angles at both sensors to be decreased by a factor of $\theta_E$. Thus, the angles actually seen at sensors 310 and 320 are $\theta_A'$ and $\theta_B'$ respectively, where:

$$\theta_A' = \theta_A - \theta_E \quad (1)$$

and $$\theta_B' = \theta_B - \theta_E \quad (2)$$

Therefore, when the differential sensor sums the observed angles, the following result is obtained:

$$\theta_A' + \theta_B' = \theta_A + \theta_B - 2\theta_E \quad (3)$$

Thus, an error factor of $-2\theta_E$ appears in the summed total.

Figure 5:
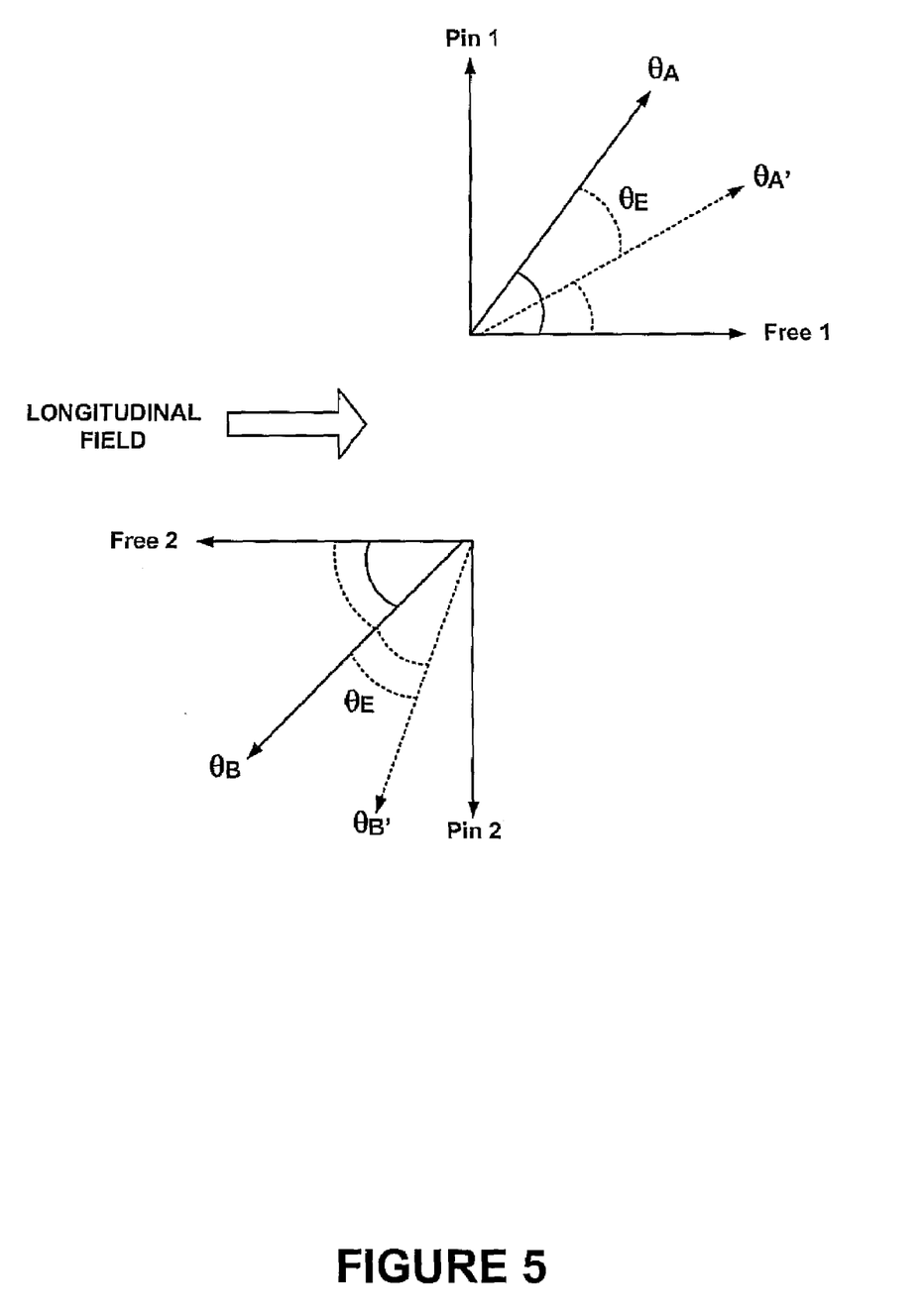
FIG. 5 graphically illustrates an example of the effect of longitudinal stray fields on differential sensors comprising anti-parallel free layers, in accordance with an embodiment of the present invention.

On the other hand, if free layers 311 and 321 have magnetisms that are anti-parallel, this error factor will be reduced. FIG. 5 graphically illustrates an example of the effect of longitudinal stray fields on differential sensors comprising anti-parallel free layers, in accordance with an embodiment of the present invention. Once again, in the absence of any stray field, the angle between free layer 311 (Free1) and pinned layer 313 (Pin1) would be $\theta_A$ and the angle between free layer 321 (Free2) and pinned layer 323 (Pin2) would be $\theta_B$. Under an anti-parallel configuration of the free layers, introducing a longitudinal stray field to the system as indicated causes the angle at sensor 310 to be decreased by a factor of $\theta_E$ and the angle at sensor 320 to be increased by a factor of $\theta_E$. Once again, let the angles actually seen at sensors 310 and 320 be $\theta_A'$ and $\theta_B'$ respectively, where:

$$\theta_A' = \theta_A - \theta_E \quad (4)$$

and $$\theta_B' = \theta_B + \theta_E \quad (5)$$

Now, when the differential sensor sums the observed angles, the following result is obtained:

$$\theta_A' + \theta_B' = \theta_A + \theta_B \quad (6)$$

Thus there is no net effect of longitudinal stray fields when the magnetizations of the differential sensor's free layers are anti-parallel.

Figure 6:
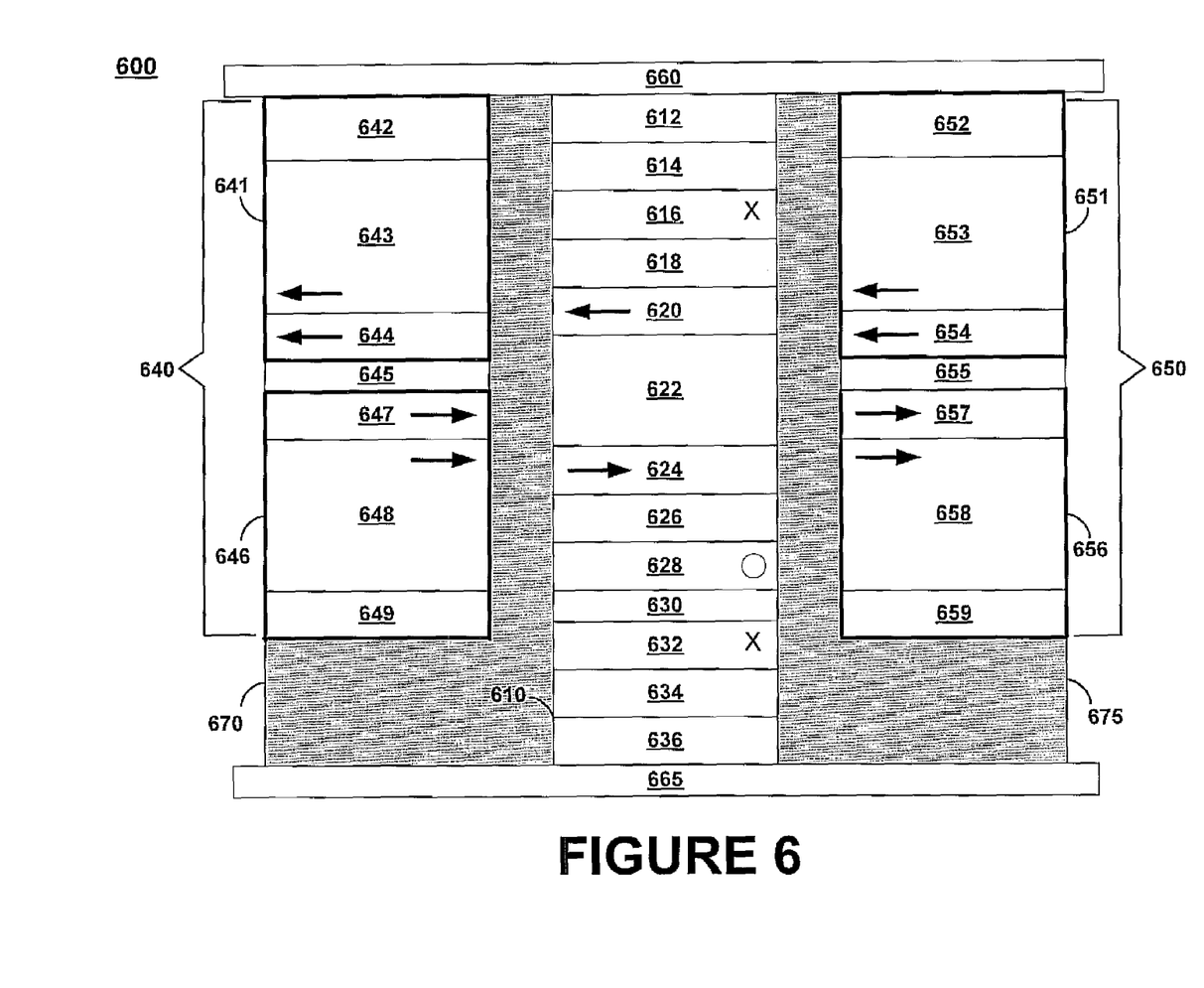
FIG. 6 illustrates a structure for a read head as viewed from the air bearing surface, in accordance with an embodiment of the present invention.

FIG. 6 illustrates a structure for a read head as viewed from the air bearing surface, in accordance with an embodiment of the present invention. The magnetization of any elements having magnetic moments has been indicated accordingly by an arrow, a knot (coming out of the page), or a cross (going into the page). In one embodiment, read head 600 includes a differential sensor 610 for reading data from a storage medium and a stabilization material 640 and 650 on either side of the sensor 610. Differential sensor 610 and stabilization materials 640 and 650 are separated by insulating layers 670 and 675. In one embodiment, insulating layers 670 and 675 are aluminum oxide.

In one embodiment, differential sensor 610 includes a first free layer 624 and a second free layer 620. The magnetization of free layers 620 and 624 is anti-parallel as a result of the magnetic fields generated by stabilization materials 640 and 650 (discussed below). Free layers 620 and 624 are separated by read gap 622, commonly comprising copper. It should be appreciated that free layers 620 and 624 can be comprised of cobalt iron alloy or nickel iron alloy. Differential sensor 610 includes copper layers 618 and 626, copper ferrite layers 616, 628 and 632, ruthenium layer 630, iridium manganese chromium (IrMnCr) alloy layers 614 and 634 and tantalum layers 612 and 636.

In one embodiment, stabilization materials 640 and 650 each include two hard magnets 641 & 646 and 651 & 656 respectively. Hard magnet 641 comprises layers 642, 643 and 644. Hard magnet 646 comprises layers 647, 648 and 649. Hard magnet 651 comprises layers 652, 653, 654. Hard magnet 656 comprises layers 657, 658 and 659. Hard magnets 641 and 646 are arranged such that their magnetic moments are anti-parallel and are separated by anti-parallel coupling material 645. Hard magnets 651 and 656 area also arranged such that their magnetic moments are anti-parallel and are separated by anti-parallel coupling material 655. In one embodiment, anti-parallel coupling materials 645 and 655 are chromium. It is appreciated that anti-parallel coupling materials other than Chromium may be used instead. In one embodiment, hard magnets 641 and 651 each include an iron layer 644 and 654 disposed adjacent anti-parallel coupling materials 645 and 655, a cobalt/platinum/chromium alloy layer 643 and 653 disposed adjacent to iron layers 644 and 654, and a tantalum layer 642 and 652 disposed adjacent to cobalt/platinum/chromium alloy layers 643 and 653. In one embodiment, the cobalt/platinum/chromium alloy is CoPtCr. In one embodiment, hard magnets 646 and 656 each include an iron layer 647 and 657 disposed adjacent anti-parallel coupling materials 645 and 655, a cobalt/platinum/chromium alloy layer 648 and 658 disposed adjacent to iron layers 647 and 657, and a chromium layer 649 and 659 disposed adjacent to cobalt/platinum/chromium alloy layers 643 and 653.

In preferred embodiments, it is important that the magnetic moment of hard magnet 651 is parallel to the magnetic moment of hard magnet 641 and that the magnetic moment of hard magnet 656 is parallel to the magnetic moment of hard magnet 646. Under this arrangement, the anti-parallel coupling within stabilization materials 640 and 650 is very large (on the order of 4000-5000 Oe). Stabilization materials 640 and 650 give off some stray fields which stabilize the direction of the magnetization of free layers 620 and 624 such that the magnetic moment of free layer 620 becomes parallel with the magnetic moments of hard magnets 641 and 651 and the magnetic moment of free layer 624 becomes parallel with the magnetic moments of hard magnets 646 and 656. In other words, the magnetic moments of free layers 620 and 624 with respect to each other become anti-parallel.

Thus, embodiments of the present invention achieve anti-parallel magnetization of the free layers of a differential sensor. Since the magnetization of the free layers is anti-parallel, the differential sensor is therefore insensitive to longitudinal stray fields.

Embodiments of the present invention are thus described. While the present invention has been described in particular embodiments, it should be appreciated that the present invention should not be construed as limited by such embodiments, but rather construed according to the below claims.

What is claimed is:

1. A read head for a data storage device comprising:
   a differential sensor for reading data from a data storage medium comprising a first free layer and a second free layer, wherein magnetization of said free layers is anti-parallel;
   a first stabilization material disposed adjacent to said differential sensor, said first stabilization material comprising:
     a first hard magnet; and
     a second hard magnet, wherein magnetization of said second hard magnet is anti-parallel to magnetization of said first hard magnet; and
   a second stabilization material disposed adjacent to said differential sensor, said second stabilization material comprising:
     a third hard magnet; and
     a fourth hard magnet, wherein magnetization of said second hard magnet is anti-parallel to magnetization of said first hard magnet, wherein further anti-parallel coupling of said first stabilization material and said second stabilization material enhances said anti-parallel magnetization of said free layers.

2. The read head as described in claim 1 wherein said differential sensor further comprises:
   a first copper layer disposed adjacent to said first free layer;
   a first copper ferrite layer disposed adjacent to said copper layer;
   a first ruthenium layer disposed adjacent to said copper ferrite layer;
   a second copper ferrite layer disposed adjacent to said ruthenium layer;
   a first IrMnCr alloy layer disposed adjacent to said second copper ferrite layer;
   a second copper layer disposed adjacent to said second free layer;
   a third copper ferrite layer disposed adjacent to said second copper layer;
   a second IrMnCr alloy layer disposed adjacent to said third copper ferrite layer; and
   first tantalum layer disposed adjacent to said second IrMnCr alloy layer.

3. The read head as described in claim 2 wherein said differential sensor further comprises a tantalum layer disposed adjacent to said first IrMnCr alloy layer.

4. The read head as described in claim 2 wherein said differential sensor further comprises a second ruthenium layer disposed adjacent to said first IrMnCr alloy layer.

5. The read head as described in claim 1 wherein said free layers comprise a cobalt iron alloy.

6. The read head as described in claim 1 wherein said free layers comprise a nickel iron alloy.

7. The read head as described in claim 1 wherein said first hard magnet of said first stabilization material comprises:
   an iron layer;
   a CoPtCr alloy layer disposed adjacent to said iron layer; and
   a tantalum layer disposed adjacent to said CoPtCr alloy layer.

8. The read head as describe in claim 7 wherein said second hard magnet of said first stabilization material comprises:
   an iron layer;
   a CoPtCr alloy layer disposed adjacent to said iron layer; and
   a chromium layer disposed adjacent to said CoPtCr alloy layer.

9. The read head as described in claim 1 wherein said first stabilization material further comprises a chromium layer disposed between said first hard magnet and said second hard magnet.

10. The read head as described in claim 1 further comprising an insulating material disposed between said differential sensor and said first stabilization material.

11. The read head as described in claim 10 wherein said insulating material comprises Aluminum Oxide.

12. A data recording device comprising:
   a disk with a data surface;
   a rotator for rotating said disk; and
   a read/write head for reading and writing data with respect to said data surface, said read/write head comprising:
      a differential sensor for reading data from a data storage medium comprising a first free layer and a second free layer, wherein magnetization of said free layers is anti-parallel;
      a first stabilization material disposed adjacent to said differential sensor, said first stabilization material comprising:
         a first layer; and
         a second layer, wherein magnetization of said second layer is anti-parallel to magnetization of said first layer; and
      a second stabilization material disposed adjacent to said differential sensor, said second stabilization material comprising:
         a third layer having a magnetic moment; and
         a fourth layer, wherein magnetization of said second layer is anti-parallel to magnetization of said first layer,
      wherein further anti-parallel coupling of said first stabilization material and said second stabilization material enhances said anti-parallel magnetization of said free layers.

13. The data recording device as described in claim 12 wherein said differential sensor further comprises:
   a first copper layer disposed adjacent to said first free layer;
   a first copper ferrite layer disposed adjacent to said copper layer;
   a first ruthenium layer disposed adjacent to said first copper ferrite layer;
   a second copper ferrite layer disposed adjacent to said ruthenium layer;
   a first IrMnCr alloy layer disposed adjacent to said second copper ferrite layer;
   a second copper layer disposed adjacent to said second free layer;
   a third copper ferrite layer disposed adjacent to said second copper layer;
   a second IrMnCr alloy layer disposed adjacent to said third copper ferrite layer; and
   first tantalum layer disposed adjacent to said second IrMnCr alloy layer.

14. The data recording device as described in claim 13 wherein said differential sensor further comprises a tantalum layer disposed adjacent to said first IrMnCr alloy layer.

15. The data recording device as described in claim 13 wherein said differential sensor further comprises a second ruthenium layer disposed adjacent to said first IrMnCr alloy layer.

16. The data recording device as described in claim 12 wherein said free layers comprise a cobalt iron alloy.

17. The data recording device as described in claim 12 wherein said free layers comprise a nickel iron alloy.

18. The data recording device as described in claim 12 wherein said first layer of said first stabilization material comprises:
   an iron layer;
   a CoPtCr alloy layer disposed adjacent to said iron layer; and
   a tantalum layer disposed adjacent to said CoPtCr alloy layer.

19. The data recording device as describe in claim 18 wherein said second layer of said first stabilization material comprises:
   an iron layer;
   a CoPtCr alloy layer disposed adjacent to said iron layer; and
   a chromium layer disposed adjacent to said CoPtCr alloy layer.

20. The data recording device as described in claim 12 wherein said first stabilization material further comprises a chromium layer disposed between said first layer and said second layer.

21. The data recording device as described in claim 12 further comprising an insulating material disposed between said differential sensor and said first stabilization material.

22. The data recording device as described in claim 21 wherein said insulating material comprises Aluminum Oxide.

* * * * *

UNITED STATES PATENT AND TRADEMARK OFFICE
CERTIFICATE OF CORRECTION

| | | |
|---|---|---|
| PATENT NO. | : 7,643,255 B2 | Page 1 of 1 |
| APPLICATION NO. | : 11/378824 | |
| DATED | : January 5, 2010 | |
| INVENTOR(S) | : Hardayal S. Gill | |

It is certified that error appears in the above-identified patent and that said Letters Patent is hereby corrected as shown below:

Col. 6, Claim 1, Line 40: Delete "second"
and insert -- fourth --

Col. 6, Claim 1, Line 41: Delete "first"
and insert -- third --

Col. 6, Claim 2, Line 48: Delete "a first copper ferrite layer disposed adjacent to said copper"
and insert -- a first copper ferrite layer disposed adjacent to said first copper --

Col. 6, Claim 2, Line 50: Delete "a first ruthenium layer disposed adjacent to said copper"
and insert -- a first ruthenium layer disposed adjacent to said first copper --

Col. 6, Claim 2, Line 53: Delete "ruthenium layer;"
and insert -- first ruthenium layer; --

Col. 6, Claim 3, Line 65: Delete "differential sensor further comprises a tantalum layer dis-"
and insert -- differential sensor further comprises a second tantalum layer dis- --

Col. 7, Claim 8, Line 15: Delete "describe"
and insert -- described --

Col. 8, Claim 13, Line 4: Delete "a first copper ferrite layer disposed adjacent to said copper"
and insert -- a first copper ferrite layer disposed adjacent to said first copper --

Col. 8, Claim 13, Line 9: Delete "ruthenium layer;"
and insert -- first ruthenium layer; --

Col. 8, Claim 14, Line 21: Delete "wherein said differential sensor further comprises a tantalum"
and insert -- wherein said differential sensor further comprises a second tantalum --

Signed and Sealed this
Twelfth Day of April, 2011

David J. Kappos
*Director of the United States Patent and Trademark Office*